(12) United States Patent
Meverden et al.

(10) Patent No.: US 6,812,304 B2
(45) Date of Patent: Nov. 2, 2004

(54) PROCESS FOR PRODUCING IMPROVED PREMIXED SUPPORTED BORAARYL CATALYSTS

(75) Inventors: Craig C. Meverden, Mason, OH (US); Michael W. Lynch, West Chester, OH (US)

(73) Assignee: Equistar Chemicals, LP, Houston, TX (US)

( * ) Notice: Subject to any disclaimer, the term of this patent is extended or adjusted under 35 U.S.C. 154(b) by 0 days.

(21) Appl. No.: 09/789,431

(22) Filed: Feb. 21, 2001

(65) Prior Publication Data

US 2002/0013218 A1 Jan. 31, 2002

Related U.S. Application Data

(63) Continuation-in-part of application No. 09/593,875, filed on Jun. 14, 2000, now Pat. No. 6,444,765.

(51) Int. Cl.$^7$ ................................................. C08F 4/52
(52) U.S. Cl. ....................... 526/160; 526/127; 526/129; 526/134; 526/170; 526/141
(58) Field of Search ................................. 526/160, 126, 526/170

(56) References Cited

U.S. PATENT DOCUMENTS

| | | | |
|---|---|---|---|
| 4,338,424 A | 7/1982 | Morita et al. | 526/65 |
| 4,414,369 A | 11/1983 | Kuroda et al. | 526/65 |
| 4,420,592 A | 12/1983 | Kato et al. | 526/65 |
| 4,461,873 A | 7/1984 | Bailey et al. | 525/240 |
| 4,508,843 A | 4/1985 | Etherton et al. | 502/115 |
| 4,530,914 A | 7/1985 | Ewen et al. | 502/113 |
| 4,565,795 A | 1/1986 | Short et al. | 502/110 |
| 4,703,094 A | 10/1987 | Raufast | 526/65 |
| 4,752,597 A | 6/1988 | Turner | 502/104 |
| 4,791,180 A | 12/1988 | Turner | 526/160 |
| 4,937,299 A | 6/1990 | Ewen et al. | 526/119 |
| 5,032,562 A | 7/1991 | Lo et al. | 502/111 |
| 5,275,991 A | 1/1994 | Buehler et al. | 502/107 |
| 5,539,076 A | 7/1996 | Nowlin et al. | 526/348.1 |
| 5,539,124 A | 7/1996 | Etherton et al. | 548/402 |
| 5,554,775 A | 9/1996 | Krishnamurti et al. | 556/7 |
| 5,637,660 A | 6/1997 | Nagy et al. | 526/160 |
| 5,902,866 A | 5/1999 | Nagy et al. | 526/133 |
| 6,201,076 B1 * | 3/2001 | Etherton et al. | 526/74 |
| 6,211,311 B1 * | 4/2001 | Wang et al. | 526/131 |
| 6,291,386 B1 * | 9/2001 | Wang | 502/124 |
| 6,403,736 B1 * | 6/2002 | Wang | 526/160 |
| 6,444,765 B1 * | 9/2002 | Meverden | 526/153 |

FOREIGN PATENT DOCUMENTS

| | | |
|---|---|---|
| EP | 0 719 797 A2 | 7/1996 |
| WO | WO 97/23512 | 7/1999 |

OTHER PUBLICATIONS

Fripiat, J.J., et al.: "Hydroxyl Content in Silica Gel 'Aerosil'," *Journal of Physical Chemistry*: vol. 66, pp. 800–805 (1962).

Wang, S.: U.S. patent application Ser. No. 09/318,009 filed May 25, 1999: "Process for the In–Situ Preparation of Single–Site Transition Metal Catalysts and Polymerization Process." (35 pages).

Wang, S., et al.: U.S. patent application Ser. No. 09/439,462 filed Nov. 15, 1999: "Olefin Polymerization Catalysts Containing Modified Boraaryl Ligands." (19 pages).

Meverden, C.C.: U.S. patent application Ser. No. 09/593,875 filed Jun. 14, 2000: "Olefin Polymerization Process for Producing Broad MWD Polymers." (18 pages).

* cited by examiner

Primary Examiner—David W. Wu
Assistant Examiner—Rip Lee
(74) Attorney, Agent, or Firm—William A. Heidrich; Gerald A. Baracka

(57) ABSTRACT

A process for preparing premixed supported boraaryl catalysts having improved shelf life is provided. The process comprises supporting an organometallic compound comprising a group 3–10 transition metal or lanthanide metal and at least one boraaryl ligand an inorganic support which has been chemically and thermally dehydroxylated to remove all hydroxyl from the surface of the support; contacting with an organoaluminum compound utilizing an incipient wetness procedure wherein 90 to 150 percent of the catalyst pore volume is filled with a hydrocarbon solution containing the organoaluminum and provide a molar ratio of aluminum to transition/lanthanide metal of 0.5:1 to 50:1; and recovering the premixed catalyst powder.

10 Claims, No Drawings

PROCESS FOR PRODUCING IMPROVED PREMIXED SUPPORTED BORAARYL CATALYSTS

CROSS-REFERENCE TO RELATED APPLICATIONS

This application is a continuation-in-part of application Ser. No. 09/593,875, filed Jun. 14, 2000, U.S. Pat. No. 6,444,765.

FIELD OF THE INVENTION

This invention relates to a process for preparing improved premixed catalysts useful for producing broad MWD polyolefins. The process comprises premixing a supported boraaryl catalyst with a organoaluminum compound utilizing an incipient wetness procedure wherein a controlled amount of organoaluminum compound, sufficient to fill 90–150 percent of the pore volume of the supported boraaryl catalyst while achieving the desired Al to catalyst metal ratio, is used. Premixed catalysts obtained by the process are useful for the preparation of broad and/or bimodal molecular weight distribution polyolefins and, surprisingly, exhibit improved storage stability.

BACKGROUND OF THE INVENTION

Interest in metallocene and non-metallocene single-site catalysts has continued to grow rapidly in the polyolefin industry. These catalysts are more active than conventional Ziegler-Natta catalysts, and they produce polymers with improved physical properties. The improved properties include narrow molecular weight distribution, reduced low molecular weight extractables, enhanced incorporation of α-olefin comonomers, and lower polymer density. Examples of non-metallocene single-site catalysts include catalysts containing a boraaryl moiety such as borabenzene, boranaphthalene or boraphenanthrene. See U.S. Pat. No. 5,554,775 and PCT Int. Appl. WO 97/23512.

Unfortunately, the uniformity of molecular weight distribution (MWD) reduces the thermal processing ability of polyolefins made with single-site catalysts. These polyolefins also have a higher tendency to melt fracture, especially at higher molecular weights. These disadvantages combine to make it difficult to process polyolefins produced by single-site catalysts under conditions normally used for Ziegler-Natta polymers. Controllable broadening of MWD is therefore a desired advance in single-site catalyst technology.

One method of increasing processability and broadening MWD of polyolefins produced by single-site catalysts is to physically mix two or more different polyolefins to produce a blended polyolefin mixture with a multimodal, broad molecular weight distribution. For example, see U.S. Pat. No. 4,461,873. In addition, olefin polymerization has been performed in a dual reactor system in order to broaden MWD. The olefin is polymerized by a catalyst in one reactor under one set of conditions, and then the polymer is transferred to a second reactor under a different set of conditions. The first reactor typically produces a high-molecular-weight component, and the second reactor produces a low-molecular-weight component. See U.S. Pat. Nos. 4,338,424, 4,414,369, 4,420,592, and 4,703,094. Lastly, a one-reactor, two-catalyst process has also been used to make multimodal, broad-MWD polymers. The olefin is polymerized in one reactor by two catalysts with different reactivity to form a reactor blend having broad and/or multimodal molecular weight distribution. The catalysts may be either two (or more) separate metallocenes or a metallocene and a Ziegler-Natta component. See, for example, U.S. Pat. Nos. 4,937,299 and 4,530,914, in which at least two separate metallocenes are used in one reactor to form multimodal polymers. See U.S. Pat. Nos. 5,032,562 and 5,539,076 for examples of the metallocene/Zeigler-Natta catalyst mixture in one reactor.

A significant disadvantage of each of these methods is the added cost of using two reactors or two catalysts in the polymerization process. A simpler method would use a single catalyst system that produces broad MWD polymers in a one-reactor process. For example, EP 719,797 A2 discloses an olefin polymerization process in which conventional metallocenes and at least two different co-catalysts are used to produce broad/bimodal MWD polyolefins. In addition, copending application Ser. No. 09/439,462 discloses a method for producing broad and/or bimodal polyolefins using a catalyst comprising an activator and an organometallic compound that incorporates a modified boraaryl ligand.

Premixed catalyst systems obtained by reacting an organoaluminum with a supported boraaryl catalyst have now unexpectedly been found to be useful for the production of broad MWD polyolefins. These results are particularly surprising since co-pending U.S. application Ser. No. 09/318,009 teaches that olefin polymerization with a boraaryl catalyst produces polyolefins with narrow MWD when organoaluminums are added to the reactor, without a premixing step.

While the catalysts produced in this manner, i.e., by premixing, are extremely useful and exhibit high activity when freshly prepared, the instability of alkylated transition metal catalyst complexes of this type has been a recognized and long-standing problem, particularly in the presence of trace impurities. It would be highly advantageous if premixed catalysts having improved storage stability suitable for the production of broad and/or bimodal MWD polyolefin resins and having other desirable properties were available. These and other advantages are achieved with the catalyst preparation process described hereafter.

SUMMARY OF THE INVENTION

The invention is a process for preparing premixed catalysts for the production of broad MWD polyolefins. More particularly, the process is directed to a process for the production of premixed supported boraaryl catalysts which have increased shelf life, i.e., the period of time which the catalyst can be stored and still be suitable for use is extended. Specifically the process comprises (1) preparing a supported catalyst comprising an inorganic oxide support which has been chemically and thermally dehydroxylated to remove substantially all hydroxyl from the support surface and an organometallic compound comprising a group 3–10 transition metal or lanthanide metal and at least one boraaryl ligand; (2) contacting the supported catalyst from (1) with a organoaluminum compound to fill from about 90 to 150 percent of the pore volume of the supported catalyst and provide a mole ratio of aluminum to transition/lanthanide metal from 0.5:1 to 50:1; and (3) recovering the premixed catalyst powder.

Contacting of the catalyst with the organoaluminum compound is carried out utilizing an incipient wetness procedure wherein a controlled amount of hydrocarbon solution containing the organoaluminum compound sufficient to achieve the desired molar ratio of aluminum to transition/lanthanide metal without being in significant excess of what is required to fill the pore volume is used. In this way highly active free-flowing catalyst powders are produced with little or no drying. Furthermore, it has unexpectedly been found that premixed catalysts produced in this manner retain their activity even after extended periods of storage.

In a particularly useful embodiment of the invention the inorganic support is silica which is chemically treated with a hexaalkyl disilazane, preferably hexamethyldisilazane, and calcined at 200–700° C. The organoaluminum compounds employed for the premixing are preferably trimethylaluminum, triethylaluminum or triisobutylaluminum. An ionic borate or aluminate activator, most notably tri(n-butyl)ammonium tetrakis(pentafluorophenyl)borate, trityl tetrakis(pentafluorophenyll)borate and trityl tetrakis (pentofluorophenyl)aluminate, is preferably included with the organometallic compound and dehydroxylated silica when preparing the supported catalyst.

DETAILED DESCRIPTION OF THE INVENTION

The process of the invention comprises preparing a catalyst system by premixing an organoaluminum compound with a supported catalyst comprising a support and an organometallic compound comprising a Group 3–10 transition or lanthanide metal and at least one boraaryl ligand. The premixed supported catalyst component is effective for polymerizing olefins when combined with an activator and additional organoaluminum compound, which may be the same as or different from the organoaluminum used for preparation of the premixed catalyst component. Also, the activator may advantageously be incorporated with the premixed supported catalyst component.

The supported catalyst of the invention comprises a support and an organometallic compound. The organometallic compound useful in the invention contains at least one boraaryl ligand. Suitable boraaryl ligands include substituted or unsubstituted boraaryl groups, such as substituted or unsubstituted borabenzenes, boranaphthalenes or boraphenanthrenes, as described in U.S. Pat. No. 5,554,775, the teaching of which is incorporated herein by reference. The metal, M, may be any Group 3 to 10 transition or lanthanide metal. Preferably, the catalyst contains a Group 4 to 6 transition metal; more preferably, the catalyst contains a Group 4 metal such as titanium or zirconium.

The transition or lanthanide metal may also have other polymerization-stable anionic ligands. Suitable ligands include cyclopentadienyl (substituted or unsubstituted) anions such as those described in U.S. Pat. Nos. 4,791,180 and 4,752,597, the teachings of which are incorporated herein by reference. Suitable ligands also include another boraaryl group or a substituted or unsubstituted azaborolinyl, pyrrolyl, indolyl, quinolinyl, hydroxypyridinyl, or aminopyridinyl group as described in U.S. Pat. Nos. 5,554,775, 5,539,124, 5,637,660, and 5,902,866, the teachings of which are also incorporated herein by reference.

The boraaryl ligand and the other polymerization-stable anionic ligand can be bridged. Groups that can be used to bridge the ligands include, for example, methylene, ethylene, 1,2-phenylene, dialkylsilyls, and diarylsilyls. Normally, only a single bridge is used in the single-site catalyst, but complexes with two bridging groups can be used. Bridging the ligand changes the geometry around the transition metal and can improve catalyst activity and other properties, such as molecular weight, comonomer incorporation, and thermal stability.

Other suitable ligands include halides and $C_1$–$C_{20}$ alkoxy, siloxy, or dialkylamido ligands. Particularly preferred ligands are halides.

The organometallic compound is immobilized on a support to form the supported premixed catalyst of the invention. The support is preferably a porous material. The support can be inorganic oxides, inorganic chlorides, and organic polymer resins, or mixtures thereof. Preferred inorganic oxides include oxides of Group 2, 3, 4, 5, 13, or 14 elements. Preferred inorganic chlorides include chlorides of the Group 2 elements. Preferred organic polymer resins include polystyrene, styrene-divinylbenzene copolymers, and polybenzimidazole. Particularly preferred supports include silica, alumina, silica-aluminas, magnesias, titania, zirconia, magnesium chloride, and polystyrene.

Preferably, the support has a surface area in the range of about 10 to about 700 $m^2/g$, more preferably from about 50 to about 500 $m^2/g$, and most preferably from about 100 to about 400 $m^2/g$. Preferably, the pore volume of the support is in the range of about 0.1 to about 4.0 mL/g, more preferably from about 0.5 to about 3.5 mL/g, and most preferably from about 0.8 to about 3.0 mL/g. Preferably, the average particle size of the support is in the range of about 10 to about 500 $\mu$m, more preferably from about 10 to about 200 $\mu$m, and most preferably from about 10 to about 100 $\mu$m. The average pore diameter is typically in the range of about 10 to about 1000 Å, preferably about 20 to about 500 Å, and most preferably about 50 to about 350 Å.

The organometallic compound is supported using any of a variety of immobilization techniques. In one method, organometallic compound is dissolved in a solvent and combined with the support. Evaporation of the solvent gives a supported catalyst. An incipient wetness method can also be used.

The support can be used without any pre-treatment prior to immobilization of the organometallic compound, but a support pre-treatment step is preferred. The support may be calcined and/or modified by a chemical additive. If the support is pre-treated by calcination, the calcination temperature is preferably greater than 150° C. The chemical additives used to pre-treat the support include triaklylaluminums, alumoxanes, organoboranes, organomagnesiums, organosilanes, and organozinc compounds. Support modification techniques are taught in U.S. Pat. Nos. 4,508,843, 4,530,913, and 4,565,795, the teachings of which are incorporated herein by reference.

Preferably, the support is silylated prior to use. Silylation is used to remove acidic sites from the support surface. Silylation is performed by reacting the support with a silylating agent, either in solution by incipient wetness or impregnation, or in the vapor phase. Preferred silylating agents include alkylsilyl halides, alkyldisilazanes, alkyl and aryl alkoxysilanes. Preferred alkylsilyl halides include trialkylsilyl halides, dialkylsilyl dihalides, and alkylsilyl trihalides, which preferably have the formula $R^3R^4R^5SiX$, $R^3R^4SiX_2$ or $R^3SiX_3$. Particularly preferred alkylsilyl halides are trimethylchlorosilane, dimethyldichlorosilane, t-butyldimethylchlorosilane, and trimethylsilyl iodide.

Suitable alkyl disilazanes include hexaalkyl disilazanes having the formula $R^3{}_3SiNHSiR^3{}_3$. In particular, hexamethyldisilazane is preferred.

Preferred alkyl or aryl alkoxysilanes include trialkyl alkoxysilanes, dialkyl dialkoxysilanes, and alkyl trialkoxysilanes, which preferably have the formula $R^3R^4R^5Si(OR^6)$, $R^3R^4Si(OR^5)(OR^6)$ or $R^3Si(OR^4)(OR^5)(OR^6)$ where $R^3$, $R^4$, $R^5$, and $R^6$ denote the same or different $C_1$–$C_{20}$ hydrocarbyl. Exemplary alkyl alkoxysilanes are cyclohexylmethyldimethoxysilane, methyltrimethoxysilane, methyltriethoxysilane, phenyltriethoxysilane, and dicyclopentyldimethoxysilane.

Optionally, the support can be treated with an organoboron compound following silylation. Preferred organoboron compounds include trialkylborons, triarylborons, and trialkoxyborons having the formula $R^3R^4R^5B$ or $B(OR^3)(OR^4)(OR^5)$. Most preferred are trimethylboron, triethylboron, tripropylboron, triisobutylboron, trimethoxyboron, triethoxyboron, tripropoxyboron, and triphenoxyboron.

The organoboron compound is added to the support in an amount preferably in the range of about 0.1 to 10 mmoles of boron per gram of support, more preferably from about 0.2 to 5 mmoles/gram, and most preferably from about 0.5 to 3 mmoles/gram. Treatment with the organoboron compound may be performed in either the liquid phase or in the vapor phase. In the liquid phase, the organoboron compound is applied to the support as a liquid, either by itself or as a solution in a suitable solvent such as a hydrocarbon. In the vapor phase, the organoboron compound is contacted with the support in the form of a gas or by injecting liquid modifier into the preheated support to vaporize the modifier. Treatment temperatures are preferably in the range of from about 20° C. to about 400° C. The organoboron treatment step can be carried out in a batch, semi-continuous, or continuous manner.

The support is preferably heated at a temperature from about 50° C. to about 1000° C., more preferably from about 100° C. to about 800° C., either before or after the organoboron modification. In another method, the support heat treatment and organoboron modification occur simultaneously as the organoboron compound in the vapor phase is passed over a heated support as discussed above.

Before addition to the olefin polymerization reactor, the supported catalyst is premixed with an organoaluminum compound to form the catalyst system of the invention. The organoaluminum is a trialkyl or triaryl aluminum compound, which preferably has the formula $AlR^1_3$ where $R^1$ denotes a $C_1$–$C_{20}$ hydrocarbyl. Most preferably, the organoaluminum is trimethyl aluminum (TMA), triethyl aluminum (TEAL), or triisobutyl aluminum (TiBAL). The premixing can be accomplished by a variety of methods. For example, the supported catalyst can be mixed in a solution containing the organoaluminum. Alternatively, the organoaluminum can be added to the supported catalyst by an incipient wetness technique. By utilizing this latter technique it is possible to obtain catalysts which retain their catalyst activity after extended periods of storage.

Suitable activators include ionic borates and aluminates such as tri(n-butyl)ammonium tetrakis(pentafluorophenyl) borate, trityl tetrakis(pentafluorophenyl)borate or trityl tetrakis(pentafluorophenyl)aluminate. The molar ratio of the metal of the activator component to the transition or lanthanide metal of the catalyst is preferably in the range of about 0.1:1 to 10:1, and more preferably from about 0.3:1 to 3:1.

For polymerization, the premixed supported catalyst component is injected into a reactor containing one or more olefin monomers and a second, i.e., additional, organoaluminum compound. The second organoaluminum is also a trialkyl or triaryl aluminum compound, which preferably has the formula $AlR^1_3$ where $R^1$ denotes a $C_1$–$C_{20}$ hydrocarbyl, and most preferably is trimethyl aluminum, triethyl aluminum, or triisobutyl aluminum. This organoaluminum cocatalyst may be the same as or different from the organoaluminum component used for preparation of the premixed supported catalyst component. If an activator is not included in the catalyst premixing step, it can also be added to the polymerization reactor.

The premixed catalysts of the invention are used to polymerize olefins, preferably α-olefins. Suitable α-olefins include, for example, ethylene, propylene, 1-butene, 1-hexene, 1-octene, and the like, and mixtures thereof. The process is also valuable for copolymerizing ethylene with other α-olefins or di-olefins (e.g., 1,3-butadiene, 1,4-hexadiene, 1,5-hexadiene).

The polymerization process is preferably a liquid phase (slurry, solution, suspension, bulk) process. The pressure in the polymerization reaction zones typically ranges from about 15 psia to about 15,000 psia, and the temperature usually ranges from about –100° C. to about 300° C. Slurry phase processes are preferred. A slurry process involves pressures in the range of about 1 to about 500 atmospheres and temperatures in the range of about –60° C. to about 100° C. The reaction medium employed should be liquid under the conditions of polymerization and relatively inert. Preferably, it is an alkane, a cycloalkane, or an aromatic hydrocarbon such as toluene, ethylbenzene, or xylene. More preferably, hexane or isobutane is employed.

Supported boraaryl catalysts obtained from the premixing operation can be introduced into the polymerization reactor directly from the premixing vessel or they may be stored for later use. They can be added to the polymerization reactor in powder or granular form or may be dispersed in a suitable hydrocarbon solvent, either the same or different than that employed in the premixing steps. If the catalysts are to be stored, they should be stored in powder form in an oxygen and moisture-free atmosphere.

In one highly useful embodiment of this invention, premixed supported boraaryl catalysts which unexpectedly have significantly improved storage stability are produced by proper selection and control of certain process parameters. To achieve premixed catalysts with improved stability, inorganic supports which are essentially completely dehydroxylated by chemical and thermal pretreatments are employed. Additionally, the organoaluminum compound is contacted with the support containing the organometallic catalyst compound and, if present, the activator compound using an incipient wetness procedure wherein a controlled amount, sufficient to fill 90 to 150 percent and, more preferably, 95 to 135 percent of the pore volume of the support containing the catalyst component, of the organoaluminum compound with a suitable hydrocarbon is added in a controlled manner to the supported catalyst component. For this procedure, the amount of organoaluminum compound combined with the hydrocarbon solvent must be sufficient to achieve the desired mole ratio of aluminum to transition/lanthanide metal at the pore volume loading employed. The amount of organoaluminum compound and the concentration of the organoaluminum component in the hydrocarbon will, of course, vary with the pore volume of the supported catalyst component and the desired loading level. The molar ratio of aluminum to transition/lanthanide metal, preferably Zr, will range from 0.5:1 to 50:1 and, more preferably, from 1:1 to 30:1.

For this preferred embodiment inorganic oxide supports are the supports of choice and silica has been found to be particularly advantageous. The support is chemically and thermally treated to remove substantially all surface hydroxyl groups, i.e., dehydroxylate the support. Silica surface hydroxyl content can be determined by reaction with CH3MgI as described by Fripiat and Uytterhoeven (*Journal of Physical Chemistry*, 66, 800, 1962). In this method silica gel is reacted with $CH_3MgI$ in anhydrous ether in a constant volume apparatus and the pressure of the evolved methane is measured. Silica surface hydroxyl content is taken to be proportional to the molar amount of evolved methane as calculated using the ideal gas law: number of moles=pressure increase×[volume of apparatus/(gas constant× temperature)]. For a silica which has been completely dehydroxylated the pressure increase in this test will be zero (within the normal error of measurement).

Chemical treatment is accomplished by contacting, i.e., pretreating, the support material with an organosilane. Any of the conventional silylating agents may be employed for this purpose; however, silylated supports obtained by reacting the support with alkyl disilazanes and particularly hexaalkyl disilazanes are preferred. Hexamethyldisilazane is an especialy useful silylating agent. Thermal treatment is carried out at 100° C. to 800° C. and, more preferably, 200° C. to 700° C. Chemical treatment may be carried out either before or after thermal treatment.

After deposition of the organometallic catalyst component and, if desired, the activator compound, the supported catalyst is contacted with the organoaluminum compound to form the alkylated catalyst complex. To achieve premixed catalysts of the invention which retain a high degree of activity for extended periods, contact with the organoaluminum compound is carried out using an incipient wetness procedure.

Incipient wetness procedures are known and have been used for the preparation of Ziegler-Natta catalysts wherein minimum levels of solvent are employed for the deposition of magnesium compounds on the support. In this regard, reference may be had to Buehler, et al., U.S. Pat. No. 5,275,991 and related patents. For the present invention, an organoaluminum compound in a hydrocarbon solvent is contacted with the supported boraaryl catalyst component in a controlled manner wherein from 90 to 150 percent and, more typically, 95 to 135 percent of the pore volume of the support containing the catalyst component is filled. Addition of the organoaluminum compound in this manner is believed to improve micro-deposition on the surface and within the pores of the supported catalyst and produces supported high activity catalysts useful for the polymerization of broad MWD polyolefins and which, surprisingly, retain their high activity even after being stored for extended periods. Other advantages can be achieved with catalysts produced in this manner, such as the ability to produce resins having increased bulk density.

Still another advantage of using the incipient wetness procedure is that it is possible to recover free-flowing premixed catalyst powders directly, i.e., without a drying step, by controlled addition of the organoaluminum and by utilizing an amount of organoaluminum which is not in significant excess of the amount required to completely fill the pore volume. This amount can be as high as 150 percent of the measured pore volume but more typically will be 135 percent or less of the measured pore volume and, most preferably, 120 percent or less of the measured pore volume. The amount will vary depending on the support material used and other process parameters. At least 90 percent of the pore volume should be filled and, more preferably, 95 percent or more of the pore volume is filled. If the amount of solution containing the organoaluminum is in sufficient excess of that required to completely fill the pore volume, the supported catalyst may become sticky and will need to be dried in order to recover a free-flowing catalyst powder. This is not detrimental to catalyst activity provided the amount used does not exceed the maximum limits set forth above and the drying is not performed under conditions which are too fast or too hot. If a drying step is required it will generally be conducted such that the rate of solvent removal is from about 0.05 to about 5 g solvent/g support/hr.

The following examples merely illustrate the invention. Those skilled in the art will recognize many variations that are within the spirit of the invention and scope of the claims.

EXAMPLE 1

Preparation of Catalyst Supported on Triethylboron-treated Silica

Neat hexamethyldisilazane (HMDS), in an amount equivalent to 12.5 weight percent of the silica, is slowly added to stirring Davison 948 silica and is mixed for 2 hours. The HMDS-treated silica is then dried at 150° C. for 6 hours in a fluidized bed dryer with dry nitrogen gas flow. At room temperature, a heptane solution of triethylboron (TEB, 10 wt. %), in an amount equivalent to 1.68 mL TEB solution per gram of the silica, is slowly added to a heptane slurry of HMDS-treated silica prepared above (2.4 mL heptane/gram silica). The slurry is then refluxed in an oil bath at 100° C. for 6 hours. After cooling to room temperature, the liquid is removed by vacuum and the solid is dried.

A solution of cyclopentadienyl(1-methylboratabenzene) zirconium dichloride (39.9 g, 0.125 mol) and trityl tetrakis (pentafluorophenyl)borate (138 g, 0.149 mol) in toluene (6.51 L) is added to the TEB-modified silica (2.27 kg). The suspension is stirred for 40 minutes, then vacuum dried to give Catalyst 1. Catalyst loading is 0.53 wt. % Zr and 0.20 wt. % B.

EXAMPLE 2

Preparation of Catalyst Supported on HMDS-treated Silica

Neat hexamethyldisilazane (HMDS), in an amount equivalent to 12.5 weight percent of the silica, is slowly added to stirring Davison 948 silica and mixed for 2 hours. The HMDS-treated silica is then dried at 600° C. for 6 hours in a fluidized bed dryer with dry nitrogen gas flow. A solution of cyclopentadienyl(1-methylboratabenzene) zirconium dichloride (13 g, 0.041 mol) and trityl tetrakis (pentafluorophenyl)borate (49.8 g, 0.054 mol) in toluene (450 mL) is added to the HMDS-treated silica (450 g) at room temperature. The mixture is stirred for 40 minutes, then vacuum dried to give Catalyst 2. Catalyst loading is 0.90 wt. % Zr.

COMPARATIVE EXAMPLE 3

Ethylene/Hexene Co-polymerization by Catalyst 1 with Organoaluminum Added to Reactor Only Slurry polymerization is conducted in a stirred 1.0-liter, stainless-steel reactor. Polymerization is run at 70° C. and 500 psi. Dry, oxygen-free isobutane (375 mL) is charged to the dry, oxygen-free reactor at room temperature along with 75 mL of 1-hexene and an organoaluminum in the amount and type specified in Table 1. The reactor is heated to 70° C. and allowed to equilibrate. Ethylene is then introduced to give a total pressure of 500 psig, and the reactor is allowed to equilibrate again. The catalyst of Example 1 (20 mg) is then injected into the reactor along with 50 mL of isobutane. Ethylene is then fed to the reactor continuously to maintain a constant pressure. At the end of one hour, ethylene flow is stopped and the reactor is vented to remove the isobutane and unreacted ethylene. The polymer is allowed to dry overnight, and is then weighed.

EXAMPLE 4

Ethylene/Hexene Co-polymerization by Catalyst 1 with Organoaluminum Added in both Premixing and Polymerization Steps The polymerization is run according to the same procedure as Comparative Example 3, except that Catalyst 1 is premixed with a heptane solution of organoaluminum (0.4 mol/L $AlR_3$) in the amount and type specified in Table 1. The catalyst is contacted with the organoaluminum solution for 1 hour before addition into the polymerization reactor.

COMPARATIVE EXAMPLE 5

Ethylene/Butene Co-polymerization by Catalyst 2 with Organoaluminum Added to Premixing Step Only The catalyst of Example 2 is premixed with a heptane solution of organoaluminum (0.4 mol/L TEAL or 0.23 mol/L TiBAL) in the amount and type specified in Table 2. The catalyst is contacted with the organoaluminum solution for 1 hour before addition into the polymerization reactor.

Slurry polymerization is conducted in a stirred 1.0-liter, stainless-steel reactor. Polymerization is run at 70° C. and 400 psi. Dry, oxygen-free isobutane (400 mL) is charged to the dry, oxygen-free reactor at room temperature along with 50 mL of 1-butene (no organoaluminum is added to the reactor in this comparative example). The reactor is heated to 70° C. and allowed to equilibrate. Ethylene is then introduced to give a total pressure of 400 psig, and the reactor is allowed to equilibrate again. The pre-mixed catalyst is then injected into the reactor along with 50 mL of isobutane. Ethylene is then fed to the reactor continuously to maintain a constant pressure. At the end of one hour, ethylene flow is stopped and the reactor is vented to remove the isobutane and unreacted ethylene. The polymer is allowed to dry overnight and is then weighed.

EXAMPLE 6

Ethylene/Butene Co-polymerization by Catalyst 2 with Organoaluminum Added in both Pre-alkylation and Polymerization Steps The polymerization is run according to the same procedure as Comparative Example 5, except that an organoaluminum in the amount and type specified in Table 2 is added to the reactor with the isobutane prior to polymerization. In Examples 6D–H, the premixing step is performed by an incipient wetness method where the organoaluminum solution is added to Catalyst 2 (1.5 mL solution per gram of catalyst), then the residual solvent is evaporated at room temperature. The premixed catalysts in Examples 6D–H are stored overnight before use. The catalyst and organoaluminum are premixed for 30 minutes in Example 6B and for 1 hour in Examples 6A, 6C, and 6I.

COMPARATIVE EXAMPLE 7

Ethylene/Butene Co-polymerization by Metallocene Catalyst

Neat hexamethyldisilazane (HMDS), in an amount equivalent to 12.5 weight percent of the silica, is slowly added to stirring Davison 948 silica and mixed for 2 hours. The HMDS-treated silica is then dried at 600° C. for 6 hours in a fluidized bed dryer with dry nitrogen gas flow. A solution of $Cp_2ZrCl_2$ (23 mg, 0.080 mmol) and trityl tetrakis (pentafluorophenyl)borate (92 mg, 0.10 mmol) in toluene (1.5 mL) is added via incipient wetness to the HMDS-treated silica (1.0 g) at room temperature. The catalyst is then vacuum dried to give Comparative Catalyst 3. Catalyst loading is 0.66 wt. % Zr.

Polymerization runs using Comparative Catalyst 3 are run with and without pre-mixing the supported metallocene catalyst with a heptane solution of TEAL. Run 7A is conducted without the pre-mixing step. Run 7B is conducted after pre-mixing TEAL (0.4 mol/L, Al:Zr=135) and Comparative Catalyst 3 for 1 hour before addition into the polymerization reactor.

Slurry polymerization is conducted in a stirred 1.0-liter, stainless-steel reactor. Polymerization is run at 70° C. and 400 psi. Dry, oxygen-free isobutane (400 mL) is charged to the dry, oxygen-free reactor at room temperature along with 50 mL of 1-butene and TEAL in the amount specified in Table 3. The reactor is heated to 70° C. and allowed to equilibrate. Ethylene is then introduced to give a total pressure of 400 psig, and the reactor is allowed to equilibrate again. The catalyst is then injected into the reactor along with 50 mL of isobutane. Ethylene is then fed to the reactor continuously to maintain a constant pressure. At the end of one hour, ethylene flow is stopped and the reactor is vented to remove the isobutane and unreacted ethylene.

The examples show a significant broadening of polymer MWD for the process of the invention. Broader polyolefin MWD is seen when organoaluminums are added in both the premixing and polymerization steps, compared to organoaluminum addition to the reactor only (see Table 1). Copending U.S. application Ser. No. 09/318,009 also shows low MWD for polyolefins formed in a process where organoaluminum is added to the reactor only. Also, organoaluminum addition during the premixing step only also typically results in lower MWD (see Table 2). Interestingly, although this broadening of MWD is seen with catalysts that contain boraaryl ligands, conventional metallocenes show no broadening when organoaluminums are used in both pre-mixing and in the reactor (see Table 3).

Additionally, the examples show that broad and bimodal MWD polyolefins can be produced under certain conditions. Examples 4B and 6C show that pre-mixing the catalyst with a large amount of TiBAL results in bimodal MWD polymers when TEAL is used in the reactor, whereas premixing with only a small amount of TiBAL in Example 6D does not produce bimodal polymers. Examples 6E and 6F show pre-mixing the catalyst with a small amount of TEAL results in bimodal MWD polymers when TiBAL is used in the reactor, whereas premixing with a large amount of TEAL in Example 4D does not produce bimodal polymers. Thus, a process to produce bimodal polymers comprises premixing TiBAL and a boraaryl-containing organometallic compound where the Al:Zr ratio in the premixing step is greater than about 100:1, followed by olefin polymerization in the presence of the premixed catalyst, an activator and a different organoaluminum (i.e., not TiBAL). Another process to produce bimodal polymers comprises premixing TEAL and a boraaryl-containing organometallic compound where the Al:Zr ratio in the premixing step is less than about 20:1, followed by olefin polymerization in the presence of the premixed catalyst, an activator and a different organoaluminum (i.e., not TEAL).

TABLE 1

Ethylene/Hexene Polymerization Results with Catalyst 1

| Run # | Pre-Alkylation Conditions | | In reactor Organoaluminum Conditions | | Activity (g PE/g cat/h) | MWD |
|---|---|---|---|---|---|---|
| | AlR$_3$ | Al/Zr molar ratio | AlR$_3$ | Al/Zr molar ratio | | |
| *3A[a] | — | — | TEAL | 360 | 1135 | 3.4 |
| *3B | — | — | TiBAL | 360 | 980 | 2.5 |
| 4A[a] | TEAL | 180 | TEAL | 180 | 1540 | 4.4 |
| 4B[a] | TiBAL | 180 | TEAL | 180 | 2195 | 8.9[b] |
| 4C[a] | TiBAL | 180 | TiBAL | 180 | 4380 | 11.5[b] |
| 4D[a] | TEAL | 180 | TiBAL | 180 | 1480 | 6.1 |

*Comparative Example
[a]Average of 2 runs.
[b]Bimodal MWD.

TABLE 2

Ethylene/Butene Polymerization Results with Catalyst 2

| Run # | Pre-Alkylation Conditions | | In reactor Organoaluminum Conditions | | Activity (g PE/g cat/h) | MWD |
|---|---|---|---|---|---|---|
| | AlR$_3$ | Al/Zr molar ratio | AlR$_3$ | Al/Zr molar ratio | | |
| *5A | TiBAL | 260 | — | — | 5140 | 5.8 |
| 6A | TiBAL | 180 | TiBAL | 90 | 8400 | 9.6 |
| 6B | TiBAL | 70[a] | TiBAL | 130 | 6660 | 6.0 |
| 6C | TiBAL | 210 | TEAL | 90 | 1655 | 10.7[c] |
| 6D | TiBAL[b] | 8[b] | TEAL | 270 | 2015 | 5.8 |
| 6E | TEAL[b] | 2[b] | TiBAL | 270 | 1545 | 13.1[c] |
| 6F | TEAL[b] | 8[b] | TiBAL | 270 | 850 | 11.5[c] |
| 6G | TEAL[b] | 2[b] | TEAL | 270 | 2285 | 8.0 |
| 6H | TEAL[b] | 8[b] | TEAL | 270 | 1310 | 9.8 |
| 6I | TEAL | 150 | TEAL | 75 | 1540 | 7.2 |

*Comparative Example
[a]Premixed for only 30 minutes instead of 1 hour.
[b]Premixing performed by incipient wetness method.
[c]Bimodal MWD.

TABLE 3

Ethylene/Butene Polymerization Results with Conventional Metallocene

| Run # | Pre-Alkylation Conditions | | In reactor Organoaluminum Conditions | | Activity (g PE/g cat/h) | MWD |
|---|---|---|---|---|---|---|
| | AlR$_3$ | Al/Zr molar ratio | AlR$_3$ | Al/Zr molar ratio | | |
| *7A | — | — | TEAL | 270 | 1055 | 3.4 |
| *7B | TEAL | 135 | TEAL | 135 | 2275 | 3.4 |

*Comparative Example

EXAMPLE 8

Preparation of Premixed Supported Catalyst and Ethylene/Butene Co-Polymerization To demonstrate the ability to obtain premixed catalysts with enhanced storage stability a catalyst was prepared using silica which was dehydroxylated by chemical and thermal treatment. Dehydroxylation was accomplished by adding 12.5 weight percent HMDS to the silica (Davison 948) and stirring for 2 hours. The HMDS-treated silica was then calcined by heating for 6 hours at 600° C. in a fluidized bed dryer with dry nitrogen gas flow. Complete or essentially complete dehydroxylation of the silica was confirmed using the procedure of Fripiat and Uytterhoeven, supra. No pressure increase was observed with the HMDS-treated and calcined silica which denotes complete or essentially complete absence of surface hydroxyl groups, i.e., dehydroxylation.

Four hundred and fifty (450) grams of the dehydroxylated silica support was then combined with a solution comprising 13 g (0.041 mol) cyclopentadienyl(1-methylboratabenzene) zirconium dichloride, 49.8 g (0.054 mol)trityl tetrakis (pentafluorophenyl)borate and 450 mL toluene. The mixture was stirred for 40 minutes and then vacuum dried to provide a supported catalyst having a Zr content of 0.9 weight percent (0.1 mmol Zr/g catalyst) and approximate pore volume of 1 mL/g. The pore volume of the catalyst is estimated by adding small incremental amounts of heptane to a sample and determining the point at which the supported catalyst is no longer a free-flowing powder, i.e., the point at which all of the accessible pore volume is filled by heptane and the surface begins to wet with heptane.

One (1) gram of the above-prepared supported catalyst was premixed with triethyl aluminum in a dry box (pure nitrogen atmosphere with less than 0.1 ppm oxygen and moisture). For the procedure 1.5 mL of a solution of triethyl aluminum (0.13 mol Al/L heptane) was added to the catalyst powder with occasional stirring. Based on the determined pore volume of the supported catalyst, this volume of solution was sufficient to fill approximately 150 percent of the measured catalyst pore volume. At this loading, the triethyl aluminum solution was beginning to wet the surface of the catalyst powder and the mixture formed a loose agglomerate of uniform consistency. The Al/Zr molar ratio of the premixed supported catalyst was 2:1. Within 1–2 hours there was sufficient absorption and/or evaporation loss of heptane to the dry box so that the premixed catalyst once again became a free-flowing powder. The catalyst was stored overnight, and 20 mg was used to co-polymerize ethylene and butene-1 following the same procedure as in Example 6. Additional triethyl aluminum was added to the polymerization reactor with the isobutane so that the total Al/Zr molar ratio in the polymerization reactor was 270:1. Catalyst activity and MWD of the resulting copolymer are specified in Table 4.

The remaining unused premixed supported catalyst was retained in the dry box and additional 20 mg portions removed after 6, 12 and 26 days storage and identically evaluated for the co-polymerization of ethylene and butene-1. Results for these co-polymerizations are also reported in Table 4.

TABLE 4

Ethylene/Butene Polymerization Results with the Catalyst of Example 8 After Varying Storage Periods

| Run # | Catalyst Age | Activity g PE/g cat/h | MWD | Bulk Density |
|---|---|---|---|---|
| 8A | 1 day | 2285 | 8.0 | 0.355 |
| 8B | 6 days | 2725 | 6.4 | 0.326 |
| 8C | 12 days | 2115 | 9.5 | 0.386 |
| 8D | 26 days | 2015 | —[a] | 0.375 |

[a]not determined

It is apparent from the above data that minimal reduction in catalyst activity is observed with boraaryl catalysts supported on HMDS-treated and calcined silica and premixed with triethyl aluminum using the incipient wetness technique. Only 11 percent reduction in catalyst activity was observed with catalyst stored for 26 days. Furthermore, all of the catalysts produced co-polymers having broad MWDs and bulk densities generally considered to be acceptable for commercial resins.

We claim:

1. In a process for producing catalysts useful for the production of broad molecular weight distribution polyolefins using a supported boraaryl catalyst comprising an inorganic oxide support which has been chemically and thermally dehydroxylated to remove substantially all hydroxyl from the support surface and an organometallic compound comprising a group 3–10 transition metal or lanthanide metal and at least one boraaryl ligand, to obtain premixed catalyst powders having improved storage stability, the improvement comprising contacting the supported catalyst with an organoaluminum compound in a hydrocarbon solvent to fill from about 90 to 150 percent of the pore volume of the supported catalyst and provide a molar ratio of aluminum to transition/lanthanide metal from 0.5:1 to 50:1, recovering the premixed catalyst and drying under conditions such that the rate of solvent removal is from about 0.05 to about 5 g solvent/g support/hr.

2. The process of claim 1 wherein the inorganic oxide support is silica.

3. The process of claim 1 wherein the inorganic oxide support is dehydroxylated by reacting with a hexaalkyl disilazane having the formula $R^3_3SiNHSiR^3_3$ wherein $R^3$ is a $C_1$–$C_{20}$ hydrocarbyl group.

4. The process of claim 3 wherein the hexaalkyl disilazane is hexamethyldisilazane.

5. The process of claim 1 wherein the inorganic oxide support is calcined at a temperature from 200° C. to 700° C.

6. The process of claim 1 wherein an ionic borate or aluminate activator is included with the inorganic oxide support and organometallic compound.

7. The process of claim 6 wherein the activator is selected from the group consisting of tri(n-butyl)ammonium tetrakis (pentafluorophenyl)borate, trityl tetrakis (pentatluorophenyll)borate and trityl tetrakis (pentafluorophenyl)aluminate.

8. The process of claim 1 wherein the organoaluminum compound is selected from the group consisting of trimethylaluminum, triethylaluminum and triisobutylaluminum.

9. The process of claim 1 wherein the mole ratio of aluminum to transition/lanthanide metal in the supported catalyst is from about 1:1 to 30:1.

10. The process of claim 1 wherein the organoaluminum compound fills from about 95 to 135 percent of the pore volume of the supported catalyst.

* * * * *